United States Patent [19]

Munt

[11] 3,743,939
[45] July 3, 1973

[54] MULTIMETER BATTERY AND DISPLAY FUNCTION TEST APPARATUS

[75] Inventor: Irwin Munt, Elizabeth, N.J.

[73] Assignee: Weston Instruments, Inc., Newark, N.J.

[22] Filed: May 1, 1972

[21] Appl. No.: 248,852

[52] U.S. Cl. ............................... 324/73 R, 324/130
[51] Int. Cl. ............................................ G01r 15/12
[58] Field of Search ....................... 324/73, 130, 99

[56] References Cited
UNITED STATES PATENTS

| | | | |
|---|---|---|---|
| 3,633,202 | 1/1972 | Kuckein | 324/130 X |
| 3,665,305 | 5/1972 | Petrohilos | 324/130 X |

*Primary Examiner*—Alfred E. Smith
*Attorney*—William R. Sherman, Jerry M. Presson et al.

[57] ABSTRACT

An apparatus for use with a multimeter of the digital display type wherein battery voltage and the various logic components of the meter can be tested. In a meter of the type having a dual slope integrating converter ther is provided a switch for connecting the battery terminal voltage to the input of the integrator and for utilizing the reference current switching interval to establish a test portion of the measurement cycle. The reference current interval establishes a signal for a test logic package which produces signals to transfer count information directly to the display element while the count is being accumulated; to activate display complement circuitry to illuminate all segments of the display means; and to alter the scan rate illuminating those display to brighten the display during test, keeping the duty cycle thereof at a minimum level for conserving battery voltage when not on test. Using the reference voltage portion of the test cycle, the display is caused to flicker, advantageously at a one-quarter cycle rate, and all segments are caused to be illuminated during some portion of the cycle, thereby providing a simple visual check of the various logic components of the system, all display elements, and a relatively static display of the battery voltage with a single switch position. Very little additional circuitry is needed to perform all of these functions.

4 Claims, 6 Drawing Figures

DISPLAY COMPLEMENTS

+ REFERENCE CURRENT GENERATOR

3,743,939

MULTIMETER BATTERY AND DISPLAY FUNCTION TEST APPARATUS

This invention relates to meters of the type having digital displays, and, more specifically, to improvements in digital multimeters for testing the supply and display components thereof.

The prior art includes several examples of digital meters for measuring voltage and other functions in the manner of the well-known multimeters. In recent times, a relatively new species of this meter has been developed, this being referred to now as a digital multimeter. It is desirable to provide such a meter with a portable power supply so that it can fulfill all of the functions previously assigned to the more conventional multimeters as to portability and the like, and with the further advantages of digital display and improved accuracy which are characteristic of recently developed digital meters, especially those of the dual slope variety.

However, additional problems are introduced by providing the meter with a battery supply, namely, that of being assured that the various logic elements of the system are functioning properly, and of being able to assure oneself that the portable power supply is providing sufficient energy to properly operate all of the various components of the meter. This is, of course, somewhat more critical than in the "traditional" analog display type of device because of the substantially more complex and level sensitive logic circuits used in a digital meter.

Accordingly, it is an object of the present invention to provide a digital multimeter having facility for rapid and complete checking of the power supply and logic circuits and display apparatus whenever desired.

A further object is to provide a digital multimeter having means for accomplishing the checking function with ease and obtaining a substantially instantaneous response.

Broadly described, the apparatus includes a switch, which can be a part of the meter range switch, which couples the portable supply, normally a battery, to the input of the meter as a DC analog input signal. An integration circuit in the meter forms a ramp away from a datum level, the slope of this ramp being a function of the input voltage magnitude. A reference is then applied, generating a ramp of opposite slope toward the datum level and a counter counts pulses from a clock oscillator during the second ramp. The arrival of the ramp at the datum level causes the accumulated count to be transferred to a storage register from which a multiplexer selectively transfers the stored counts, individually, to decoder and driver circuits which select portions of the display to be illuminated. Separate circuitry, working from the counter accumulation, activates a scan driver system which illuminates the displays. During the battery test function, an artificial transfer count is introduced by the switch so that the count is continuously transferred, thereby causing the display to display the value of the battery voltage, as arrived at in the counter, and to cause the various display elements to flicker. The flickering enables an operator to check the operation of the various logic components, and simultaneously, permits a direct reading of the battery terminal voltage.

In order that the manner in which the foregoing and other objects can be attained in accordance with the invention, a particularly advantageous embodiment thereof will be described with reference to the accompanying drawings, which form a part of this specification, and wherein.

Figure 1:
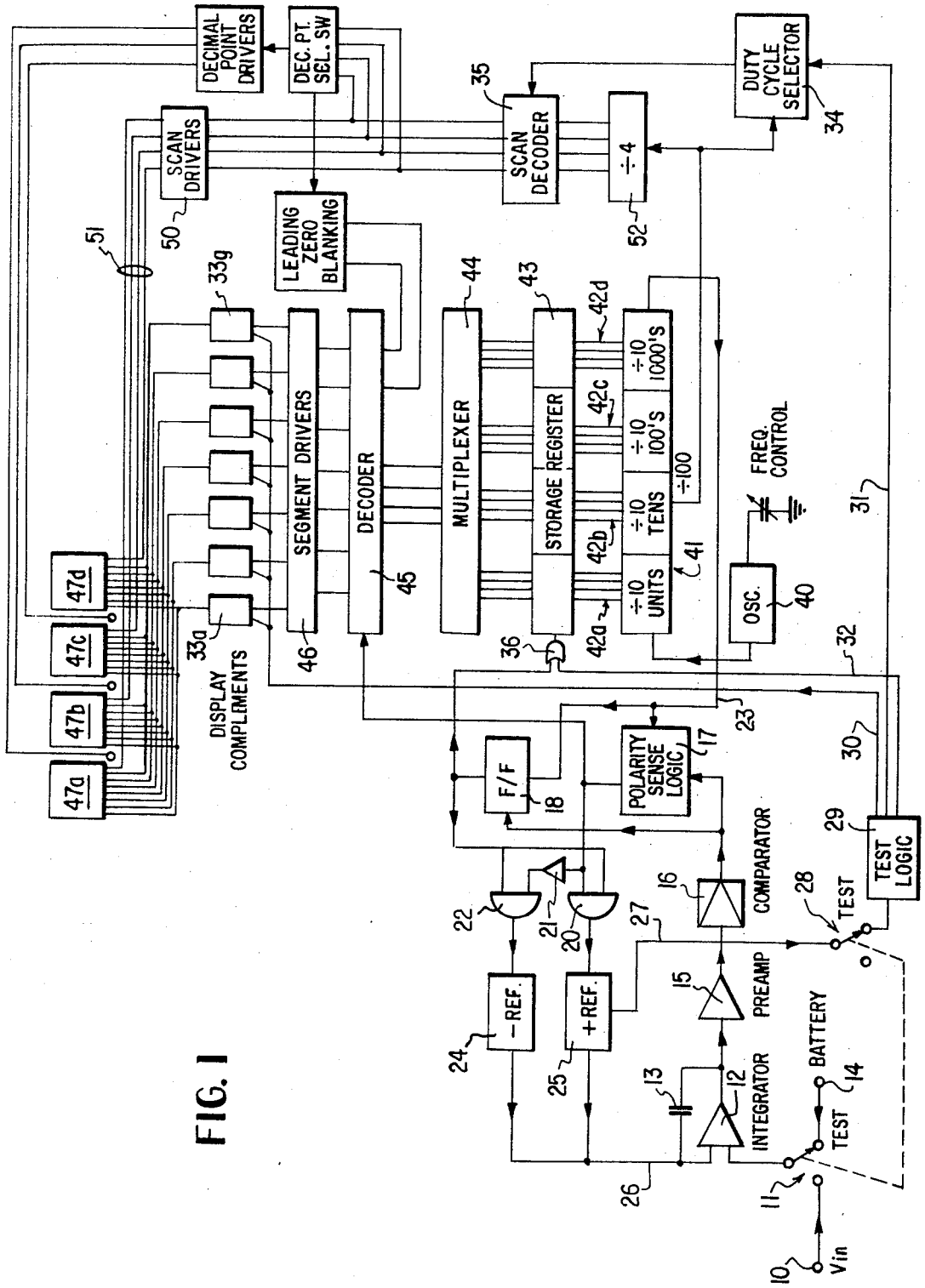
FIG. 1 is a schematic diagram of a multimeter incorporating the apparatus in accordance with the present invention.

Referring now to FIG. 1, it wil be seen that the multimeter includes an input terminal 10 to which a voltage to be measured can be applied when the multimeter is being used in the normal fashion. In such circumstances, terminal 10 is connected through a switch, indicated generally at 11, to one input terminal of a conventional high gain differential operational amplifier 12 which is provided with a feedback capacitor 13 which is connected between the output of amplifier 12 and its other input terminal to cause the amplifier to become an integrating amplifier. Switch 11 is contemplated as normally being a portion of some other switch, such as the range switch, but, in any event, it is movable to a test position in which the signal input terminal of amplifier 12 is connected directly to the supply battery for the multimeter. Thus, in the test position, the integrater is directly receiving battery terminal voltage.

The output of integrater 12 is connected through a preamplifier 15 to a comparator circuit 16 which is capable of producing an output signal whenever the voltage at the output terminal of amplifier 12 arrives at a preselected level. This signal is connected directly to a polarity sensing logic circuit 17 and to a bistable multivibrator, or flip flop circuit 18. The output of the polarity sensing logic circuit is connected to one input of an AND circuit 20 and, through an input amplifier 21, to one input of an AND circuit 22. The output of the polarity sensing logic is also connected to the decoder circuit to be described hereinafter.

An overflow signal on a conductor 23 is coupled from the counter, to be described, to an input of the polarity sensing logic and to an input of bistable circuit 18. The outputs of the comparator circuits and the counters are used to activate one or the other of AND circuits 20 or 22, thereby selecting a signal from one or two possible sources of reference current, either a negative reference current source 24 or a positive reference source 25, the selection being dependent upon the polarity of the input signal applied to terminal 10. As is well known in the operation of dual ramp multimeters, the reference to be applied is generally opposite to the polarity of the input signal. The selected reference is coupled on conductor 26 to the second input of integrating amplifier 12.

As will be recognized, when switch 11 is in the test position there is no need to make a decision about a choice of reference current, the choice being made initially by the connection of either the positive or negative terminal of the battery to terminal 14. Thus, the selection circuitry is of no particular interest to the present invention. However, it will be observed that the reference current is applied to the input of the amplifier for an interval of time sufficient only to return the integrater output voltage to its datum level. In the case of a measurement of a battery of approximately 5 volts on a meter which is set to a range (maximum reading) of 20, it will be recognized that this reference current is only applied for approximately 5 percent of the entire measurement cycle. This is controlled by the overflow from the counter starting the application of the reference voltage and the output of the comparator terminating the application of that reference voltage. The existence of this signal which is known to be in existence for 5 percent of the cycle is coupled through a conductor 27 to a switch indicated generally at 28 which, in the test position, is connected to a test logic circuit 29. Logic circuit 29 has three outputs on conductors 30, 31 and 32. The output on conductor 30 is connected to a plurality of display complement logic circuits 33a–33g, each display complement logic circuit being inserted in the conductor between a segment driver circuit and a specific segment of the display apparatus. The display complement circuit, when activated, causes the segment to be illuminated if it would not otherwise have been and vice versa.

The signal or conductor 31 is connected to a duty cycle selector circuit 34, the function of which is to increase the length of the illumination interval of each segment in the test mode to make the segments appear to be illuminated more brightly. The output of the duty cycle selector is connected to the scan decoder circuit 35 wherein the intervals of illumination are controlled.

The third output from the test logic circuit is coupled on conductor 32 to an OR gate 36 and to the transfer signal input of the storage register. A signal on conductor 32 is that which replaces the normal transfer signal from bistable circuit 18 under test conditions and causes the counter output to be continuously fed to the display logic.

The counting and display logic itself includes a clock pulse oscillator 40 in an adjustable frequency oscillator that is normally set to a frequency of, for example, 40 kHz. The output of oscillator 40 is coupled to the units counter of a series of four decade counters indicated generally at 41. These counters operate in a conventional manner in response to the application of pulses from oscillator 40 and produce BCD output for units, 10's, 100's and 1000's places on conductor groups 42a, 42b, 42c and 42d. These BCD outputs are transferred, on command, to registers in a storage register unit 43 from which they are multiplexed, still in BCD form, by a multiplexer apparatus 44 in a time-shared sequence to decoder 45. The decoder converts the input signals from four character BCD into a set of seven signals suitably coded for selecting the segments of a conventional seven segment display such as a light emitting diode display. These signals are supplied to segment driver circuits 46 which, through the display complements circuits, couple the segment driving signals to the segments of all displays, which displays are schematically indicated at 47a–d. The displays are not, however, illuminated as a result of the signals from driver circuits 46, but require the simultaneous provision of signals from a scan driver circuit 50 on conductors 51. Thus, the driver circuits 46 can provide signals which call for the illumination of those segments forming a numeral six, which signals are provided to all of displays 47a–47d. However, no display is illuminated until a signal is provided on one of the conductors 51, which signal, when provided, causes that single display to be illuminated and to show a numeral 6. The scan signals are provided in sequence, the sequence being controlled from the scan decoder circuit 35 as provided with inputs from a divide by four circuit 52. Circuit 52, as well as duty cycle selector 34, are synchronized and activated by an output taken from the 10's counter of counter circuits 41, which signal constitutes a division by 100 from the oscillator frequency. Thus, the signal provided to a circuit 52 is at a frequency of 400 Hz and the outputs of the circuits are further divided by 4 to a 100 Hz repetition rate.

Decimal point selection and driving and leading zero blanking circuits can also be provided but form no essential part of the present invention and will therefore not be further discussed.

Figure 2:
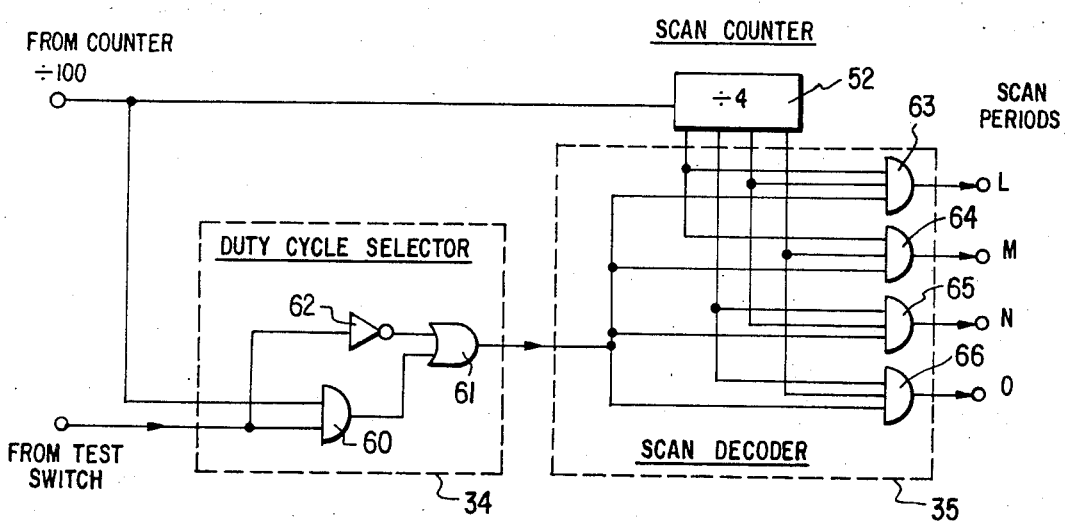
FIG. 2 is a more detailed schematic diagram of the duty cycle and scan counter portions of the apparatus of FIG. 1.

Reference is now made to FIG. 2 wherein the scan decoder and duty cycle selector circuits are shown in somewhat greater detail. A signal from the counter, which constitutes a tens signal divided by 100, is provided to the input of the divide-by-four circuit 52 and simultaneously to one input of an AND circuit 60 within the duty cycle selector circuit 34. The other input to AND circuit 60 is provided from the test switch signal on conductor 31. Thus, each pulse from the counter, during the test mode, will be coupled out of the AND circuit and directly to an input of OR circuit 61. The test switch signal is also coupled through an inverter circuit 62 to the other input of the OR circuit, the output being coupled to one input of each of four-three input and circuit 63, 64, 65 and 66. Another input of each of these AND circuits in scan decoder circuit 35 is provided by an output of the divide-by-four circuit 52, each AND circuit being provided from a different pair of outputs from divider 52 so that the AND circuits are activated in a mutually exclusive sequence, which sequence is identified at the output terminals by the letters L, M, N and O. These sequential pulses are the signals which are supplied, through the scan driver circuits 50, in sequential fashion to display circuits 47a–d to illuminate those circuits. The normal duty cycle for this display function is roughly 10 percent of the measurement cycle for each display. However, because of the flicker rate introduced, to be discussed hereafter, in the test mode, application of a signal from the test switch lengthens this interval to approximately 25 percent, permitting a brighter and more easily readable display.

Figure 3:
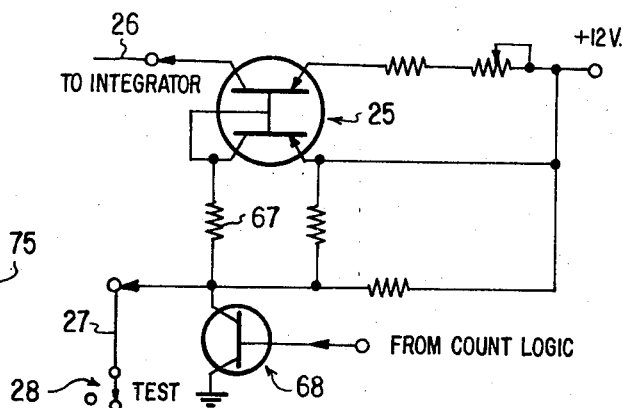
FIG. 3 is a more detailed schematic diagram of a portion of the test logic of the apparatus of FIG. 1.

The details of other portions of the logic are shown in FIG. 3 wherein the positive reference current generator indicated generally at 25 is shown connected through conductor 26 to the input of integrator amplifier 12. Likewise, an output through a resistor 67 is connected to a transistor indicated generally at 68, which transistor is provided with an output from AND circuit 20 at its base electrode to activate the reference current generated, thereby producing the desired 5 percent test interval output on conductor 27 and, when it is in the proper position, through switch 28 to test logic circuit 29. The signal thus provided through switch 28 is coupled through resistors 69, 70 and 71 to the gate electrodes of conventional field effect transistors indicated generally at 72, 73 and 74, which transistors form a part of a larger logic package and which produce the outputs on conductors 30, 31 and 32, previously discussed.

Figure 4:
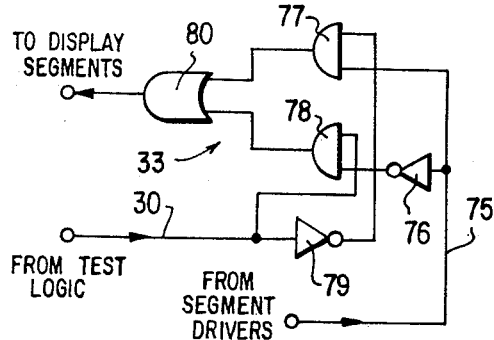
FIG. 4 is a schematic diagram of a display complement circuit usable in the apparatus in FIG. 1.

A circuit suitable for use in the display complements blocks identified as 33a–g is shown in FIG. 4 wherein the signal from a segment driver circuit arrives on a conductor 75. This signal is coupled to an inverter circuit 76 and one input of an AND circuit 77, the output of the inverter circuit being connected to one input of an AND circuit 78. Conductor 30 from test logic 29 is coupled to the other input of AND circuit 78 and, through an inverter circuit 79, to the other input of AND circuit 77. The outputs of either of AND circuits 77 and 78 can be coupled through an OR circuit 80 to the appropriate display segments.

If a signal arrives on conductor 75 and no test logic output signal from transistor 72 is present, the output of inverter 79 and the appropriate segments are illuminated. However, when a test logic output signal appears, AND circuit 78 is provided with activating inputs in the absence of a signal from the segment driver circuits, thereby causing an output from the display complement circuit when no signal from the segment driver circuit exists. Thus, the segments complements of each display digit can be illuminated upon the occurrence of the appropriate scan driver signal.

Figure 5:
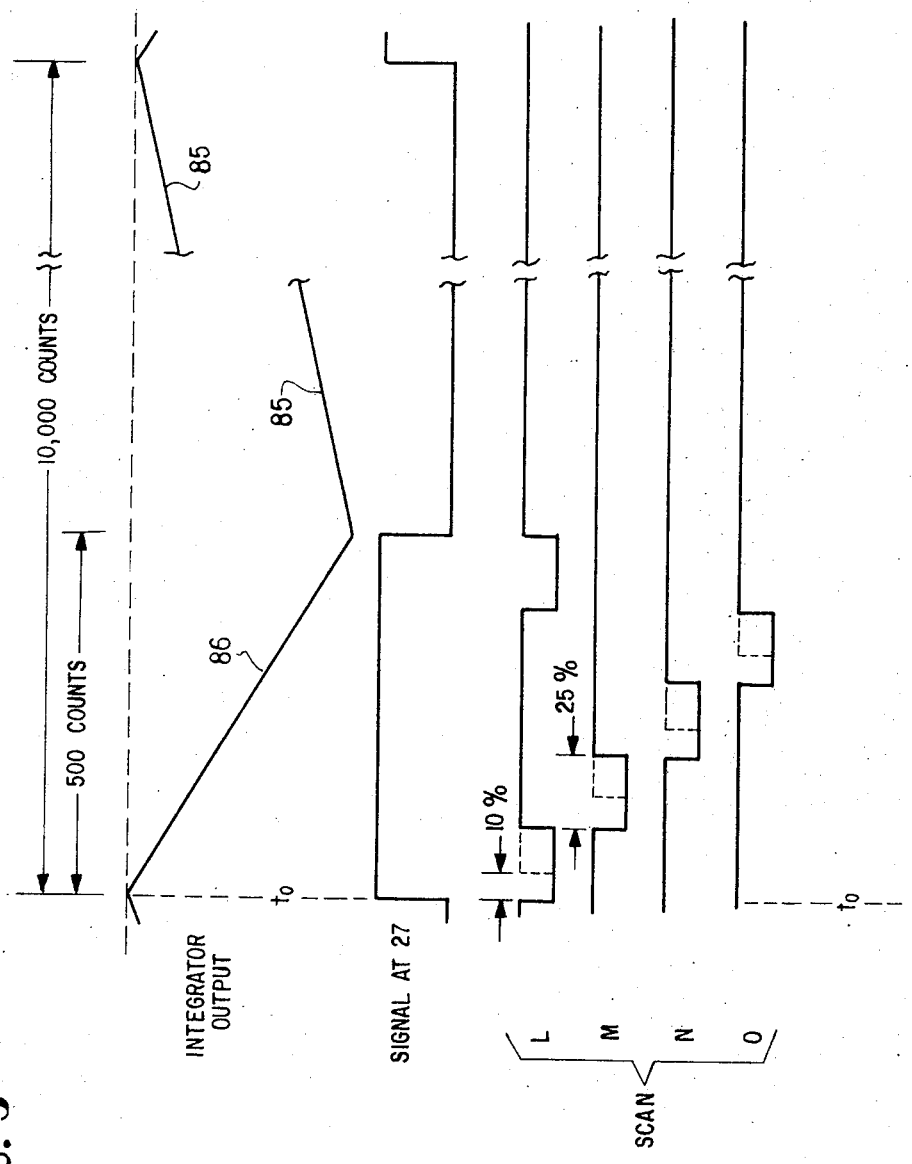
FIG. 5 is a timing diagram illustrating some aspects of the operation of the apparatus of FIGS. 1–4.

The overall operation of the test appratus can be better understood by referring to the diagrams of FIG. 5 wherein a typical series of events is depicted. First, the generation of a ramp 85 at the output of integrating amplifier 12 is presumed to have resulted from connection of a 5-volt battery to terminal 14 and placement of switch 11 in the test position. It will be apparent that these figures will result if the frequency of oscillator 40 is chosen to be 40 kHz and the total interval of each measuring cycle is selected at 10,000 counts, this choice being made simply by selecting the maximum capacity of counter 41. Obviously, in the diagram of FIG. 5, the reference voltage or return ramp, identified as 86 is substantially shorter than ramp 85, ramp 86 being only 1/20 of the total, measurement cycle in a scale diagram. With this foreshortening of ramp 65 and with the above frequency, it will be understood the time scale for the diagrams within the 10,000 count interval occupies ¼ of a second and that each event depicted therein will recur four times each second for so long as the apparatus remains in test position. Further, it will be recognized that the 500 counts which slope 86 is seen to occupy is an arbitrary selection based on the assumption of 5 volts. It is likely that the battery might only be 4.6 volts, in which case that slope would only occupy 460 counts of the 10,000 available. However, in any event, this interval will be approximately 5 percent of the measurement cycle.

Below the integrating slopes is shown the logical result of the output on conductor 27 from the positive reference current generator, which output produces a logic 1 during the interval when the reference voltage counts are being accumulated. During the remaining interval, that output exists at a logic 0. Thus, there are four intervals during each second in which the logic 1 signal at conductor 27, and hence at test logic circuit 29, is present.

The scan decoder produces, during the logic 1 signal on conductor 27, four signals which are identified as L, M, N and O, each of these signals occupying an interval which amounts to approximately 25 percent of the duration of the signal at conductor 27. It will be observed that this approximately 2.5 times the normal duty cycle interval which is indicated at the dotted lines in each of signals, L, M, N and O. These scan signals illuminate the segment as previously described. It will further be recognized that the 25 percent duty cycle is only necessary during this blinking test operation and is not desirable during normal, non-test operation, the lower duty cycle being advantageous because it conserves battery power.

It will now be seen that, in the test operation cycle, the counter begins to count pulses (or overflows into a new sequence of pulse counting) at time $t_0$ and that the voltage applied to the integrator begins to build ramp 85 while the positive reference source applies the logic 1 signal on conductor 27. The test logic circuit provides a signal to the display complement logic circuits and the transfer logic signal on conductor 31 substitutes for the usual transfer signal so that the storage register, instead of transferring the accumulated counts once per measurement cycle, is continuously transferring the continuously changing count from counter 41 through the multiplexer, decoder and segment drivers to the display. Thus, the displays, for that interval identified as the 500 counts in FIG. 5, are continuously being energized and deenergized on an irregular basis, providing some illumination of each and every segment. It is because of this irregular illumination that brightening by an increased duty cycle is necessary. As soon as the integrator has reached the level of the battery voltage the signal at 27 disappears and the test logic outputs are removed. The usual transfer signal is applied through OR circuit 36 to the storage register 43, transferring the stored and accumulated count at the instant of ramp change to the displays, but the transfer, duty cycle and complement signals from circuit 29 no longer exist. Thus, the duty cycle is again shortened and the battery voltage appears as a static display on the appropriate display indicators. It will be recognized that the rather blurred, continuously changing display occurs for 5 percent of each measurement cycle, four times per second, and that the static battery voltage display is presented for 95 percent of the measuring cycle, also four times per second. Thus, if the battery voltage is 5.00, one will observe the figures 5.00 blinking at a 1/4 cycle per second rate, and will also see the other segments of a display, those not used in presenting the battery voltage measurement display, in a rather less distinct but nevertheless clearly illuminated phase during some portion of the time. Thus, one can observe that all segments are operative and, by the fact that the system is blinking and displaying all segments as it should, one has an immediate check of all of those logic elements which exist between terminal 14 to which the battery is connected and the displays, including the duty cycle and scan decoding logic.

The complement logic is employed during the test cycle for the purpose of illuminating those segments which are less often illuminated during the usual counting process. Also, it is necessary to be sure that even those segments which might not otherwise be illuminated at all are at least tested.

Figure 6:
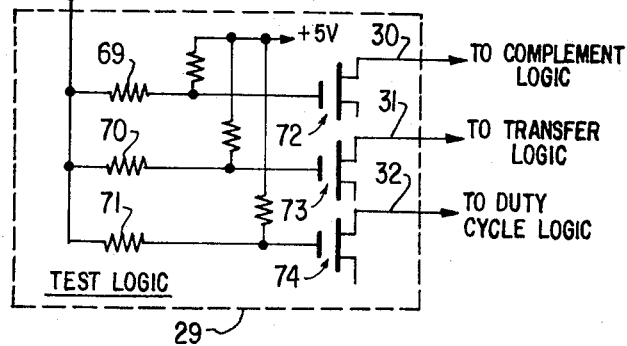
FIG. 6 is a diagram of a typical seven segment display.
Figure 6:
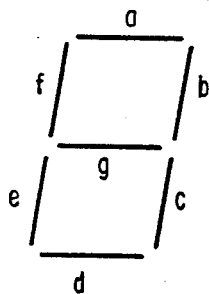

FIG. 6 is simply included to illustrate the arrangement of a conventional 7-segment display with which the invention is especially useful.

While one advantageous embodiment has been chosen to illustrate the invention, it will be understood by those skilled in the art that various changes and modifications can be made therein without departing from the scope of the invention as defined in the appended claims.

What is claimed is:

1. In a meter of the type having an integrator, a reference signal source, a portable energy source, a digital display and logic circuit means for measuring time intervals established with said integrator and for displaying a measured interval as being representative of the magnitude of an input parameter, said logic circuit means including a counter and means for transferring an accumulated count to said digital display upon command, the improvement comprising switch means movable to a test position for connecting said portable energy source to said integrator to measure the terminal voltage thereof as an input parameter; means for causing the signal from said reference signal source to be connected to said integrator for a minor fraction of each measurement cycle; and test logic circuit means coupled to said reference signal source for providing a plurality of test signals only during said minor fraction, one of said plurality of test signals constituting a transfer command signal for continuously transferring the counter accumulation for display on said display means during said minor fraction; said test logic circuit means being inactive during the remainder of each measurement cycle to permit static display of the terminal voltage of said energy source during said remainder, thereby providing a visible indication of said voltage blinking at the measurement cycle rate.

2. A meter according to claim 1 wherein said minor fraction is approximately one-twentieth, and wherein said measurement cycle rate is approximately 4 cycles per second.

3. A meter according to claim 1 wherein said logic circuit means for measuring time intervals includes means for determining a scan rate and duty cycle for illumination of said display means, and said test logic circuit means produces a test signal during said minor fraction wherein said duty cycle is significantly increased in duration.

4. Apparatus according to claim 1 wherein said logic circuit means includes means for displaying the complement of each digit and one of said plurality of test signals includes a signal for activating said display complement circuits.

* * * * *